United States Patent
Weiby et al.

(10) Patent No.: US 10,218,113 B2
(45) Date of Patent: Feb. 26, 2019

(54) LOW VOLTAGE BUS SYSTEM

(71) Applicant: IDEAL Industries, Inc., Sycamore, IL (US)

(72) Inventors: Michael Weiby, Bartlett, IL (US);
James Tyrrell, Sycamore, IL (US);
Justin Cerutti, Sycamore, IL (US);
Andrew Meyer, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 15/701,145

(22) Filed: Sep. 11, 2017

(65) Prior Publication Data

US 2018/0090877 A1  Mar. 29, 2018

Related U.S. Application Data (60) Provisional application No. 62/401,546, filed on Sep. 29, 2016.

(51) Int. Cl.
*H01R 13/62* (2006.01)
*H01R 24/62* (2011.01)
(Continued)

(52) U.S. Cl.
CPC ......... *H01R 13/6205* (2013.01); *H01R 24/62* (2013.01); *H01R 24/86* (2013.01);
(Continued)

(58) Field of Classification Search
CPC .. H01R 13/6205; H01R 24/62; H01R 25/142; H01R 2107/00; H01R 12/714; H01R 24/38; H01R 11/30; H01R 13/7031
(Continued)

(56) References Cited

U.S. PATENT DOCUMENTS 3,521,216 A * 7/1970 Tolegian ............ H01R 13/6205
                                                            439/152
6,204,632 B1   3/2001 Nierescher
(Continued)

FOREIGN PATENT DOCUMENTS

EP   2582005 A1   4/2013
FR   2613883 A1   10/1988
(Continued)

OTHER PUBLICATIONS

European Patent Office, extended European search report issued on European patent application No. 17193063.9, dated Feb. 28, 2018, 11 pages.

*Primary Examiner* — Edwin A. Leon
(74) *Attorney, Agent, or Firm* — Greenberg Traurig, LLP (57) ABSTRACT

A charging module usable with a conductive bus having a center rail disposed intermediate a first conductive rail and a second conductive rail. The charging module has a base on which is disposed a centered electrical contact and a first plurality of electrical contacts. The centered electrical contact is arranged on the base such that the centered electrical contact will engage with the center rail when the housing is placed into a use position on the conductive bus. The first plurality of electrical contacts are arranged on the base along a perimeter of a first circle that is generally centered on the centered electrical contact such that at least one of the first plurality of electrical contacts will engage with the first conductive rail and at least one different one of the first plurality of electrical contacts will engage with the second conductive rail when the housing is placed into the use position on the conductive bus in any rotational orientation of the housing relative to the conductive bus over a full 360 degrees.

16 Claims, 3 Drawing Sheets

(51) Int. Cl.
*H01R 25/14* (2006.01)
*H01R 24/86* (2011.01)
*H02J 7/00* (2006.01)
*H01R 107/00* (2006.01)

(52) U.S. Cl.
CPC .......... *H01R 25/142* (2013.01); *H02J 7/0042* (2013.01); *H01R 25/14* (2013.01); *H01R 25/147* (2013.01); *H01R 2107/00* (2013.01)

(58) Field of Classification Search
USPC .......................................................... 439/39
See application file for complete search history.

(56) References Cited

U.S. PATENT DOCUMENTS

| | | | |
|---|---|---|---|
| 9,620,893 B2* | 4/2017 | Kim | H01R 13/6205 |
| 9,678,537 B2* | 6/2017 | Kupferstein | G06F 1/1632 |
| 2004/0048511 A1 | 3/2004 | Dayan et al. | |
| 2007/0194526 A1 | 8/2007 | Randall | |
| 2010/0022285 A1 | 1/2010 | Randall et al. | |
| 2010/0055928 A1 | 3/2010 | Randall | |
| 2017/0214176 A1* | 7/2017 | Kim | H01R 13/6205 |
| 2017/0365959 A1* | 12/2017 | Flechl | H01R 24/38 |

FOREIGN PATENT DOCUMENTS

| | | |
|---|---|---|
| FR | 2904894 A1 | 2/2008 |
| WO | 2007/099412 A1 | 9/2007 |

* cited by examiner

LOW VOLTAGE BUS SYSTEM

RELATED APPLICATION INFORMATION

This application claims the benefit of U.S. application Ser. No. 62/401,546, filed on Sep. 29, 2016, the disclosure of which is incorporated herein by reference in its entirety.

BACKGROUND

U.S. application Ser. No. 14/986,225, U.S. application Ser. No. 14/857,918, U.S. application Ser. No. 14/030,768, U.S. Provisional Application No. 61/725,795, U.S. Provisional Application No. 61/768,907, U.S. Provisional Application No. 61/744,777, and U.S. Provisional Application No. 61/744,779, each of which is incorporated herein by reference in its entirety, disclose a low voltage bus system comprised of a conductive bus and a charging module which is adapted to be coupled to the conductive bus.

SUMMARY

The following particularly describes a method for making a low voltage bus system whereby it will be ensured that the electrical contacts of a charging module will make and maintain continuous electrical connection with charging rails of a conductive bus regardless of the use orientation of the charging module relative to the conductive bus. Specifically, the following is intended to provide a guideline for developing a charging module usable with a conductive bus having a center rail disposed intermediate a first conductive rail and a second conductive rail. The charging module has a base and the guidelines are usable to arrange a centered electrical contact and a first plurality of electrical contacts on the base. The centered electrical contact will be arranged on the base such that the centered electrical contact will engage with the center rail when the housing is placed into a use position on the conductive bus. The first plurality of electrical contacts will be arranged on the base along a perimeter of a first virtual circle that is generally centered on the centered electrical contact such that at least a first one of the first plurality of electrical contacts will engage with the first conductive rail and at least a second one of the first plurality of electrical contacts, different than the first one of the first plurality of electrical contacts, will engage with the second conductive rail when the housing is placed into the use position on the conductive bus in any rotational orientation of the housing relative to the conductive bus over a full 360 degrees. In this regard, it will be understood that in no use position over the full 360 degrees will any one of the plurality of electrical contacts be capable of electrically coupling, or otherwise creating an electrical short condition between, the first conductive rail and the second conductive rail. Furthermore, because the algorithms disclosed herein provide a means to design a charging module that will be able to be engaged with the conductive bus in any rotational orientation of the housing relative to the conductive bus over a full 360 degrees while using the minimal number of electrical contacts needed to achieve this purpose, the described system and method has the advantage of helping to reduce over system costs, e.g., it reduces the material costs associated with manufacturing a charging module, reduces the costs associated with purchasing and maintaining construction inventory, etc.

A better understanding of the objects, advantages, features, properties and relationships of the described personal air sampler will be obtained from the following detailed description and accompanying drawing that set forth illustrative embodiments that are indicative of the various ways in which the principles expressed hereinafter may be employed.

BRIEF DESCRIPTION OF THE DRAWINGS

For a better understanding of the subject low voltage bus system, reference may be had to preferred embodiments shown in the following drawings in which.

It is to be noted that elements in the figures are illustrated for simplicity and clarity and have not necessarily been drawn to scale. For example, the dimensions of some of the elements in the figures may be exaggerated relative to other elements to help to improve understanding of description which follows.

DETAILED DESCRIPTION

Figure 1:
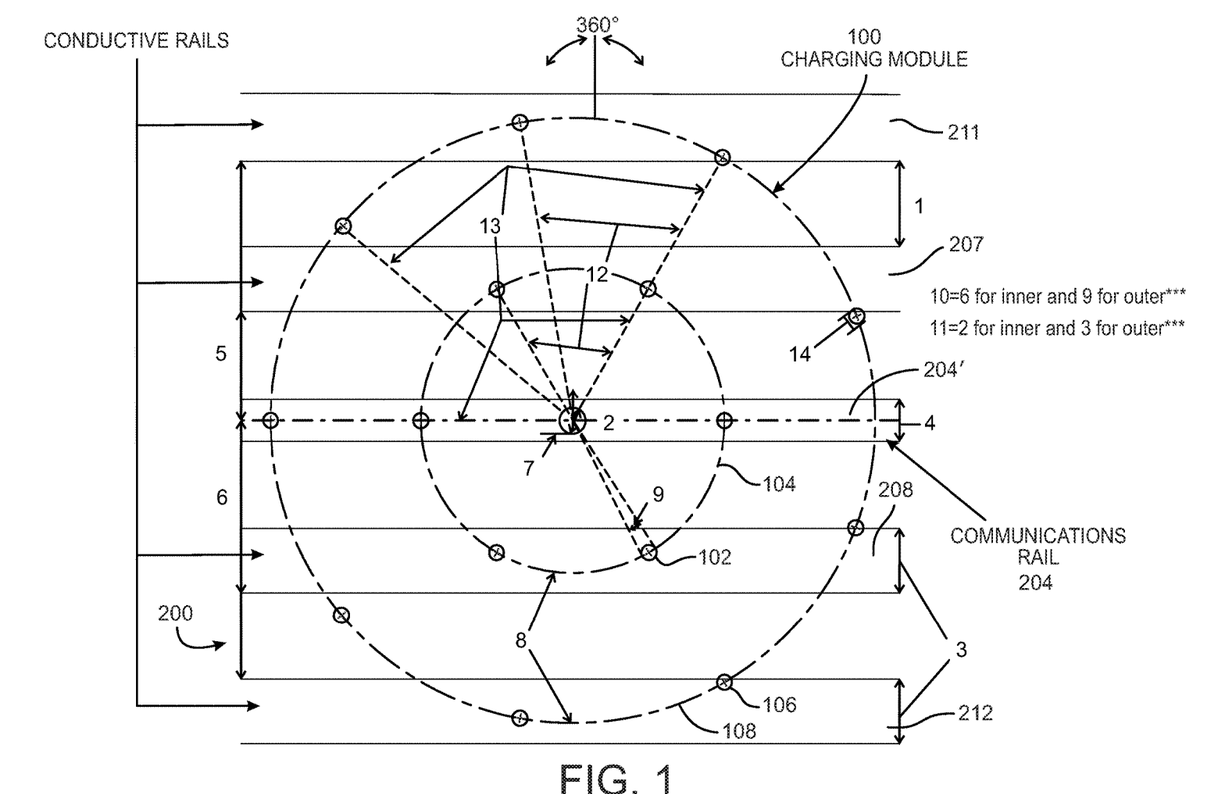
FIG. 1 is a schematic diagram illustrating an exemplary contact configuration for a charging module created via use of the methodology described hereinafter.
Figure 4:
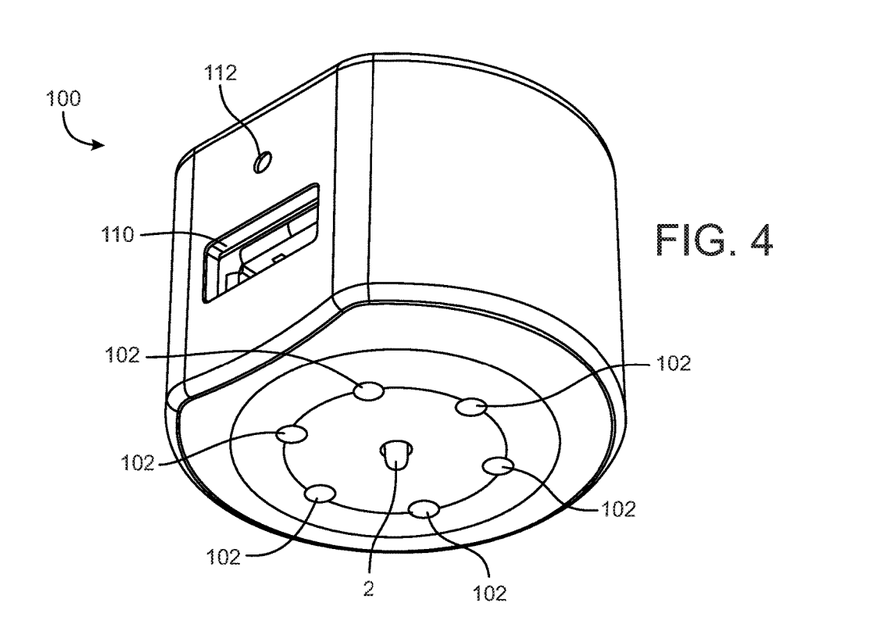

With reference to the figures, an exemplary conductive bus system is now described. In general, the conductive bus system includes a charging module 100 that is intended to be electrically coupled to a conductive bus 200. The charging module 100 includes a plurality of electrical contacts 102 that are arranged such that a first circle 104 can be visualized to generally connect the plurality of electrical contacts 102 as shown in FIGS. 1 and 4. The charging module 100 may further include, or alternatively include, a plurality of electrical contacts 106 such that a second circle 108 can be visualized to generally connect the plurality of electrical contacts 106 as also shown in FIG. 1. In a preferred embodiment, the plurality of electrical contacts 102 are intended to be used to provide a first direct voltage/current to the charging module 100 from the conductive bus 200 while the plurality of electrical contacts 106 are intended to be used to provide a second direct voltage/current to the charging module 100 from the conductive bus 200. The charging module 100 will further include electrical componentry for delivering a direct voltage/current received from the conductive bus 200 to a device that is coupled to the charging module 100. To this end, the charging module 100 may include, by way of example only, a universal serial bus (USB) port 110 for receiving a USB connector which, in turn, would be coupled to a device that is to be charged, such as a phone, computer, tablet, etc. The charging module 100 may yet further include an indicator 112, such as a light emitting diode (LED), to provide to a user an indication that the charging module 100 is receiving direct voltage/current from the conductive bus 200.

As further illustrated in FIGS. 1 and 4, centered within the plurality of electrical contacts 102, i.e., centered within the visualized first circle 104, and/or centered within the plurality of electrical contacts 106, i.e., centered within the visualized second circle 108, is a further electrical contact 2. In a preferred embodiment, the electrical contact 2 is in the form of a magnet. The electrical contact 2 is intended to, but need not be used to, receive a communication signal via the conductive bus 200. The communication signal received via the conductive bus 200 may be used to control functional operations of the charging module 100, e.g., to turn the charging module on/off, to throttle the amount of current that the charging module will draw from the conductive bus 200, etc. The communication signal received via the conductive bus 200 may additionally, or alternatively, be passed through the charging module 100 to the device that is coupled to the charging module 100 via the port 110 to thereby allow functional operations of the device being charged to be likewise controlled as desired.

Figure 2:
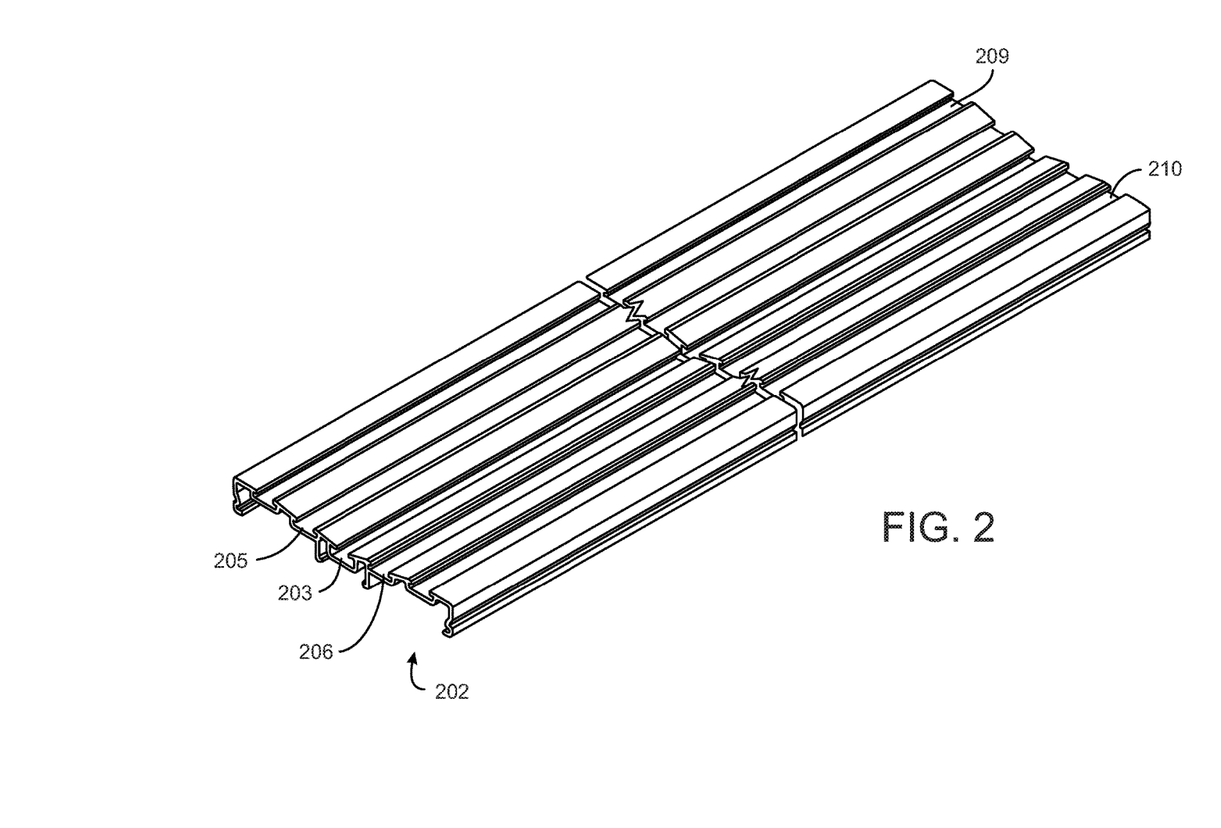
FIG. 2 illustrates an exemplary carrier of the conductive bus for use in connection with a charging module.
Figure 3:
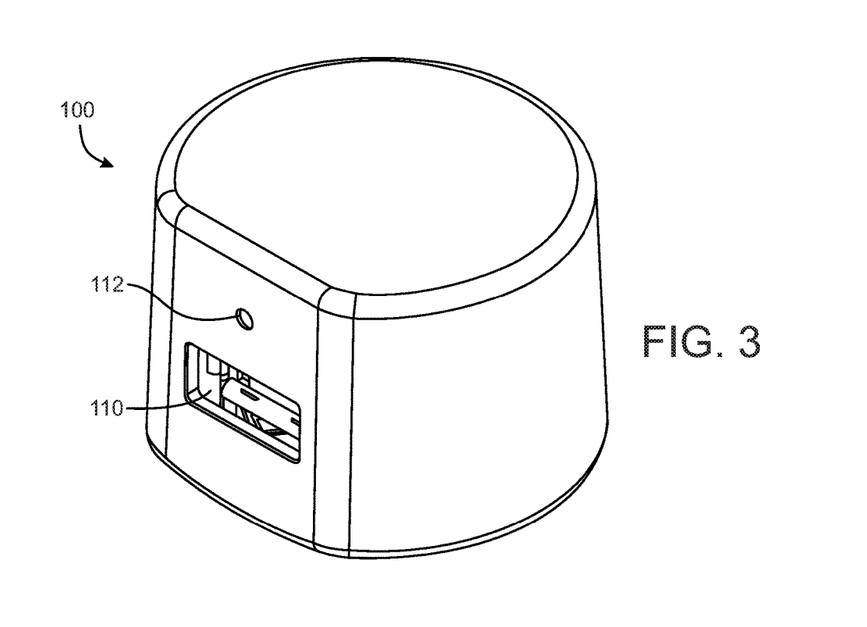
FIGS. 3 and 4 illustrate an exemplary charging module.

The conductive bus 200 to which the charging module 100 is to be coupled includes an elongated carrier 202 constructed from a non-conductive material. In a preferred embodiment, the carrier 202 includes a channel 203 in which is disposed a ferromagnetic rail 204. When disposed within the channel 203, a surface 4 of the ferromagnetic rail 204 will preferably be exposed from the conductive bus 200 whereby the electrical contact 2 will be able to directly engage with the ferromagnetic rail 204 when the charging module 100 is disposed upon the conductive bus 200. While not required, the ferromagnetic rail 204 may be used to carry a communication signal, received from a controller that is coupled to the conductive bus 200, for provision to the charging module via the electrical contact 2 as described above. The carrier 202 further includes channels 205 and 206 for carrying conductive rails 207 and 208, respectively. When disposed within the channels 205 and 206, a surface 3 of the conductive rails 207 and 208 will preferably be exposed from the conductive bus 200 whereby at least one of the plurality of electrical contacts 102 will be able to directly engage with the conductive rail 207 and at least one of the electrical contacts 102 will be able to directly engage with the conductive rail 208. The carrier 202 may further include, additionally or alternatively, channels 209 and 210 for carrying conductive rails 211 and 212, respectively. When disposed within the channels 209 and 210, a surface 3 of the conductive rails 211 and 212 will preferably be exposed from the conductive bus 200 whereby at least one of the plurality of electrical contacts 106 will be able to directly engage with the conductive rail 211 and at least one of the electrical contacts 106 will be able to directly engage with the conductive rail 212. It will be understood that different configuration for the carrier 202 may be utilized as required and, as such, the carrier 202 illustrated in FIG. 2 is being provided by way of example only.

To ensure that the charging module 100 will engage with the conductive bus 200 to thereby allow the charging module 100 to be electrically coupled to the conductive rails regardless of the use orientation of the charging module 100 when positioned upon the conductive bus 200, i.e., in any orientation of the charging module 100 throughout the full 360 degrees of the visualized circles 104 and/or 108 when the contact 2 is engaged with the rail 204 as shown in FIG. 1, the algorithms set forth hereinafter are to be used to determine the number of contacts 102 and/or 104 that are to be included in each set of the plurality of contacts, the positioning of the contacts 102 and/or 104 (as well as the contact 2), etc. given the design considerations of the conductive bus 200 and/or contacts available for use in constructing the charging module. As concerns the contact 2, it is preferred that the contact 2 be sized and arranged on the base of the charging module 100 such that, when the contact 2 is positioned in the vicinity of the rail 204, i.e., will be magnetically attracted thereto, the charging module 100 will generally center itself, i.e., generally center the virtual circles 102 and/or 106 upon a center line 204' of the rail 204, whereby, in any and all orientations of the charging module 100 relative to the conductive bus 204 at least one of the plurality of electrical contacts 102 will directly engage with the conductive rail 207 and at least one of the electrical contacts 102 will directly engage with the conductive rail 208 and, if used or in the alternative, at least one of the plurality of electrical contacts 106 will directly engage with the conductive rail 211 and at least one of the electrical contacts 106 will directly engage with the conductive rail 212.

More particularly and as described/illustrated further below, there are sixteen design inputs that may be changed to design the rail/charger interface depending on the shape of the charging module and/or the rail. Accordingly, the algorithms described hereinafter function to optimize and output the orientation and number of contacts to be located on the base of the charging module 100 given the design considerations of the conductive bus 200 and the charging module 100, i.e., the aforementioned inputs.

With reference to FIG. 1, Table 1 and Table 2 set forth the various design inputs as well as the outputs to be generated where the generated outputs are to be employed to construct the charging module 100. The algorithms for generating these outputs then follow. In addition, the following nomenclature is applicable to the subject conductive bus system and the described methodology.

Conductor rail—Strip (rail) of copper or other conductive material, e.g., rails 207, 208, 211, and 212, with a positive or negative charge, when the electrical contacts make contact with a positive and a negative conductor rail, power will flow to the charging module 100 ("CM").

Electrical contact—conductive protrusion in the CM, e.g., contacts 102 and/or 106, that will come in contact with the conductor rail and allow power to flow to the CM, it is assumed to have a circular cross section but could be of a different shape without effecting design.

Com contact—conductive protrusion in the CM, e.g., contact 2, that will come in contact with the com (communications) rail, e.g., rail 204, and allow the CM (and, in some instances, a device being charged) to communicate with the rail software, it is assumed to have a circular cross section but could be of a different shape without effecting design.

Com rail—Strip (rail) of steel or other ferrous material, e.g., rail 204, that allows the CM to attach to the rail in a nonpermanent way, e.g., magnetically, and allow the rail to communicate to the CM.

Tolerance—A distance that describes the extreme low and high of actual dimensions compared to the true dimension, this is an allowable variation generally supplied from manufacturers.

Perfect scenario—describes the case when all dimensions of actual product are true dimensions (tolerance is zero) and the center of the electrical contact circle is at the centerline of the com rail, e.g., 204', and the radius of the electrical contact circle, e.g., virtual circles 104 and/or 108, is tangent to the centerline of the conductor rail.

Worst scenario—describes the case when the center of the electrical contact circle is moved laterally by the maximum allowable amount ($T_p$) from the centerline of the com rail and tolerances are at the maximum value.

Root sum square—describes a mathematical formula where values are squared, summed together and the square root of that sum is taken, this provides an accurate measurement for multiple tolerances on a single object:

$$\sqrt{n_1^2+n_2^2+n_3^2+\ldots+n_i^2}$$

Housing—The part of the rail that holds the conductor and electrical rails in place, e.g., carrier 202, made of plastic or similar nonconductive material.

Charging Module (CM)—Device that houses the electrical contacts and the necessary electrical components to transmit power to an external device.

TABLE 1

| FIG. 1 Element | Variable | Equation | Description |
|---|---|---|---|
| Electrical Contact Inputs | 1 | $G_r$ | * | Gap between exposed edges of conductor rails |
| | ** | $T_1$ | * | Tolerance on $G_r(\pm)$ |
| | ** | $C_{dm}$ | * | Maximum outer diameter of electrical contact-this will limit how close the contacts can be in relation to each other |
| | ** | $T_2$ | * | Tolerance on $C_{dm}(\pm)$ |
| | ** | $C_{dc}$ | * | Diameter of electrical contact that is in contact with the conductor rails |
| | ** | $T_3$ | * | Tolerance on $C_{dc}(\pm)$ |

TABLE 1-continued

| FIG. 1 Element | Variable | Equation | Description |
|---|---|---|---|
| Conductor and Com Rail Inputs | 3 | W | * | Exposed conductor rail width |
| | ** | $T_6$ | * | Tolerance on W ($\pm$) |
| | 4 | $W_c$ | * | Exposed com rail width |
| | ** | $T_7$ | * | Tolerance on $W_c(\pm)$ |
| | ** | $G_c$ | * | Material gap between electrical contacts from inner edge to inner edge |
| | ** | $G_e$ | * | Minimum distance from outer edge of conductor rail to outer edge of contact |
| | ** | $T_5$ | * | Tolerance of flatness of conductor rail and housing ($\pm$) |

TABLE 2

| | FIG. 1 Element | Variable | Equation | Description |
|---|---|---|---|---|
| Outputs | 5 | $W_1$ | 1 | Distance from the center of the com rail to the inner edge of the conductor rail (Perfect scenario) |
| | 6 | $W_2$ | 2 | Distance from the center of the com rail to the outer edge of the conductor rail (Perfect scenario) |
| | 7 | $T_p$ | 3 | Distance the center of the CM can move from center of the com($\pm$) |
| | ** | $R_{max}$ | 4 | Maximum electrical contact circle radius |
| | 8 | $R_o$ | 5 | Optimized electrical contact circle radius |
| | 9 | $\alpha_c$ | 6 | Angle of individual electrical contact from edge to edge |
| | ** | $\alpha_{cg}$ | 7 | Angle corresponding to $G_c$ |
| | ** | $\alpha_{min}$ | 8 | Minimum angle allowed between contacts from center to center |
| | ** | $R_{tp}$ | 9 | Center of contact circle to the outer edge of the conductor rail (Worst scenario) |
| | ** | $a_{major.int}$ | 10 | Intermediate calculation of $\alpha_{major}$ |
| | ** | $N_{ideal}$ | 11 | Ideal number of electrical contacts |
| | ** | $N_c$ | 12 | Required number of electrical contacts |
| | ** | $N_p$ | 13 | Number of electrical circuit contacts |
| | ** | $\alpha_{minor.int}$ | 14 | Intermediate calculation of $\alpha_{minor}$ |
| | 12 | $\alpha_{minor}$ | 15 | Angle between contacts from center of sets |
| | 13 | $\alpha_{major}$ | 16 | Angle between sets of contacts from center to center |
| | 12 | $\alpha_{minor2}$ | 17 | Angle between contacts in a set when $\alpha_{major.int}$ is less than $\alpha_{min}$ |
| | 13 | $\alpha_{major2}$ | 18 | Angle between sets of contacts when a $\alpha_{minor.int}$ is less than $\alpha_{min}$ |
| | 14 | $C_d$ | 19 | Minimum electrical contact tip diameter of curvature to ensure contact with the conductor rail based on the flatness ($T_5$) between the conductor rail and the housing |
| | ** | $T_9$ | 20 | Root sum square of tolerances that effect $T_p$ |
| | ** | $T_{10}$ | 21 | Root sum square of tolerances that effect $R_{tp}$ and $R_{max}$ |
| | ** | $T_{11}$ | 22 | Root sum square of tolerances that effect $R_o$ |
| | ** | $M_{max}$ | 23 | Maximum magnet size |
| | ** | $N_{cs}$ | 24 | Number of electrical contacts per electrical circuit contact |

Within the tables:
* means these values are only inputs and, as such, there is no equation for them listed below in the algorithm section;
** means these values do not need pictorial representation or cannot be visually represented in a clear manner due to conditional factors; and
*** means an arbitrary value input (see below)

TABLE 1-continued

| FIG. 1 Element | Variable | Equation | Description |
|---|---|---|---|
| 2 | $M_d$ | * | Communication (com) contact diameter |
| ** | $T_4$ | * | Tolerance on $M_d(\pm)$ |
| ** | $T_{im}$ | * | Tolerance of injection molding of Charging module (CM) base, which holds the electrical contacts |

Thus, using the inputs noted above in tables 1 and 2, below are the algorithms for arriving at the spacing, etc. of the electrical contacts to ensure a constant electrical connection between the conductor rails and the electrical contacts in the charging module 100.

Input—changed by user.

Fixed values—from manufacturers or other internal sources which can vary from between manufacturers or processes.

Intermediate calculations—these are values that are used to find the design requirements, but may not directly visible in the design of the CM.

Design requirements—these calculations describe the optimal electrical contact layout based on the inputs and fixed values, some design outputs may not be used based on conditional outputs outlined below.

$$1.\ G_r + \frac{1}{2} * W_c = W_1$$

For the inner conductor rail.

$$a.\ 2 * G_r + W + \frac{1}{2} * W_c = W_1$$

For the outer conductor rail if $G_r$ is constant between the com rail and inner conductor rail and the inner and outer conductor rails.

$$b.\ G_{r1} + G_{r2} + W + \frac{1}{2} * W_c = W_1$$

For the outer conductor rail if $G_r$ is not constant between the corn rail and inner conductor rail and the inner and outer conductor rails.

$$2.\ G_r + \frac{1}{2} * W_c + W = W_2$$

For the inner conductor rail.

$$a.\ 2 * G_r + \frac{1}{2} * W_c + W = W_2$$

For the outer conductor rail if $G_r$ is constant between the corn rail and inner conductor rail and the inner and outer conductor rails.

$$b.\ G_{r1} + G_{r2} + \frac{1}{2} * W_c + W = W_2$$

For the outer conductor rail if $G_r$ is not constant between the corn rail and inner conductor rail and the inner and outer conductor rails.

$$3.\ \frac{1}{2} * (W_c - M_d) + T_9 = T_p$$

$$4.\ G_r + W + \frac{1}{2} * M_d - T_{10} = R_{max}$$

For the inner conductor rail.

$$a.\ 2 * G_r + 2 * W + \frac{1}{2} * M_d - T_{10} = R_{max}$$

For the outer conductor rail if $G_r$ is constant between the corn rail and inner conductor rail and the inner and outer conductor rails.

$$b.\ G_{r1} + G_{r2} + 2 * W + \frac{1}{2} * M_d - T_{10} = R_{max}$$

For the outer conductor rail if $G_r$ is not constant between the corn rail and inner conductor rail and the inner and outer conductor rails.

$$5.\ G_r + W + \frac{1}{2} * M_d - \frac{1}{2} * \sqrt{8 * T_5 * \left(\frac{1}{2} * C_{dc} - \frac{1}{2} * T_5\right)} - G_e - T_{11} = R_o$$

For the inner conductor rail.

$$a.\ 2 * G_r + 2 * W + \frac{1}{2} * M_d - \frac{1}{2} * \sqrt{8 * T_5 * \left(\frac{1}{2} * C_{dc} - \frac{1}{2} * T_5\right)} - G_e - T_{11} = R_o$$

For the outer conductor rail if $G_r$ is constant between the coin rail and inner conductor rail and the inner and outer conductor rails).

$$b.\ G_{r1} + G_{r2} + 2 * W + \frac{1}{2} * M_d - \frac{1}{2} * \sqrt{8 * T_5 * \left(\frac{1}{2} * C_{dc} - \frac{1}{2} * T_5\right)} - G_e - T_{11} = R_o$$

For the outer conductor rail, if $G_r$ is not constant between the coin rail and inner conductor rail and the inner and outer conductor rails.

$$6.\ 2 * \cos^{-1}\left(\frac{2 * R_o^2 - \left[\frac{1}{2} * C_{dm}\right]^2}{2 * R_o^2}\right) = \alpha_c$$

$$7.\ 2 * \sin^{-1}\left(\frac{\frac{1}{2} * G_c}{R_o}\right) = \alpha_{cg}$$

$$8.\ \alpha_c + \alpha_{cg} = \alpha_{min}$$

$$9.\ G_r + W_c - \frac{1}{2} * M_d + T_{10} = R_{tp}$$

For the inner conductor rail.

$$a.\ 2 * G_r + W + W_c - \frac{1}{2} * M_d + T_{10} = R_{tp}$$

For the outer conductor rail if $G_r$ is constant between the coin rail and inner conductor rail and the inner and outer conductor rails.

$$b.\ G_{r1} + G_{r2} + W + W_c - \frac{1}{2} * M_d + T_{10} = R_{tp}$$

For the outer conductor rail if $G_r$ is not constant between the coin rail and inner conductor rail and the inner and outer conductor rails.

10. $2*\left(\cos^{-1}\left[\frac{R_{tp}}{R_o}\right] - \cos^{-1}\left[\frac{\{2*R_o^2 - (\frac{1}{2}C_d)^2\}}{2*R_o^2}\right]\right) = \alpha_{major \cdot int}$ 11. $\frac{360}{\alpha_{major \cdot int}} = N_{ideal}$ 12. $N_{ideal} + \frac{1}{2} + \frac{1}{\pi} * \sum_{k=1}^{\infty} \frac{\sin(2*\pi*k*N_{ideal})}{k} = N_c$ a. $N_{ideal} \leq N_c \leq \frac{360}{\alpha_c}$ This describes the upper and lower possibilities of $N_c$ 13. $N_c \geq N_p$ 14. $\frac{360}{N_c} = \alpha_{minor \cdot int}$ 15. $\alpha_{minor}$:

a. $N_c = N_p$: $\alpha_{minor} = \frac{360}{N_c}$ b. $N_c \neq N_p$:

i. $\alpha_{minor \cdot int} < \alpha_{min}$: $\alpha_{minor} = N/A$ ii. $\alpha_{minor \cdot int} > \alpha_{min}$: $\alpha_{minor} = \alpha_{minor \cdot int}$ 16. $\alpha_{major}$:

a. $N_c = N_p$: $\alpha_{major} = $ No Sets b. $N_c \neq N_p$:

i. $\alpha_{minor \cdot int} < \alpha_{min}$: $\alpha_{major} = N/A$ ii. $\alpha_{minor \cdot int} > \alpha_{min}$: $\alpha_{major} = \frac{360}{N_p}$ 17. $\alpha_{minor2}$:

a. $N_c = N_p$: $\alpha_{minor2} = $ No Sets b. $N_c \neq N_p$:

i. $\alpha_{minor \cdot int} < \alpha_{min}$: $\alpha_{minor2} = \alpha_{min}$ ii. $\alpha_{minor \cdot int} > \alpha_{min}$: $\alpha_{minor2} = N/A$ 18. $\alpha_{major2}$:

a. $N_c = N_p$: $\alpha_{major} = $ No Sets b. $N_c \neq N_p$:

i. $\alpha_{minor \cdot int} < \alpha_{min}$: $\alpha_{major2} = \frac{360}{N_p}$ ii. $\alpha_{minor \cdot int} > \alpha_{min}$: $\alpha_{major2} = N/A$ 19. $\sqrt{8*T_5*\left(\frac{1}{2}*C_{dc} - \frac{1}{2}*T_5\right)} = C_d$ 20. $\sqrt{T_4^2 + T_7^2} = T_9$ 21. $\sqrt{T_1^2 + T_4^2 + T_6^2 + T_7^2 + T_{im}^2} = T_{10}$ For the inner conductor rail.

$\sqrt{2*T_1^2 + T_4^2 + 2*T_6^2 + T_7^2 + T_{im}^2} = T_{10}$    a.

For the outer conductor rail.

$\sqrt{T_1^2 + T_3^2 + T_4^2 + T_6^2 + T_7^2 + T_{im}^2} = T_{11}$    22.

For the inner conductor rail.

$\sqrt{2*T_1^2 + T_3^2 + T_4^2 + 2*T_6^2 + T_7^2 + T_{im}^2} = T_{11}$    a.

For the outer conductor rail.

23. $2*\left(R_o - \frac{1}{2}*C_{dm}\right) = M_{max}$

24. $\frac{N_c}{N_p} = N_{cs}$

As will now be appreciated, the algorithms set forth above provide a means to design a charging module that will be able to be engaged with the conductive bus in any rotational orientation of the housing relative to the conductive bus over a full 360 degrees while using the minimal number of electrical contacts needed to achieve this purpose. Thus, the described system and method has, among other advantages, the advantage of helping to reduce the material costs associated with manufacturing a charging module. Furthermore, because it is contemplated that the same (or very similar) electrical contacts will be used in the construction of the charging module, e.g., the electrical contacts for engaging with the conductive rails will all generally have the same rail surface engagement dimensions, the costs associated with purchasing and maintaining construction inventory will also be reduced.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A charging module for use in connection with a conductive bus having non-conductive carrier which carries a center rail disposed intermediate a first conductive rail and a second conductive rail, the charging module comprising:
   a housing having a base on which is disposed a centered electrical contact and a first plurality of electrical contacts, wherein the centered electrical contact is arranged on the base such that the centered electrical contact will engage with the center rail when the housing is placed into a use position on the conductive bus, the first plurality of electrical contacts are arranged on the base along a perimeter of a first virtual circle that is generally centered on the centered electrical contact such that at least a first one of the first plurality of electrical contacts will engage with the first conductive rail and at least a second one of the first plurality of electrical contacts, different than the first one of the first plurality of electrical contacts, will engage with the second conductive rail when the housing is placed into the use position on the conductive bus in any rotational orientation of the housing relative to the conductive bus over a full 360 degrees whereby power received from the conductive bus via an engagement between the first plurality of electrical contacts and the first conductive rail and/or the second conductive rail will be capable of being provided to a device coupled to the charging module, and the centered electrical contact is magnetically coupled to the center rail in the use position on the conductive bus.

2. The charging module as recited in claim 1, wherein the housing will automatically place itself into the use position on the conductive bus when the centered electrical contact is freely positioned within a magnetically attractive distance from the center rail.

3. The charging module as recited in claim 1, wherein the center rail carriers a communication signal and wherein the centered electrical contact receives the communication signal from the center rail for use by the charging module and/or the device coupled to the charging module when the housing is in the use position on the conductive bus.

4. The charging module as recited in claim 1, wherein the housing has a port for use in electrically coupling the device to the charging module.

5. The charging module as recited in claim 4, wherein the port comprises a universal serial bus port.

6. The charging module as recited in claim 3, wherein the housing has a port for use in electrically and communicatively coupling the device to the charging module.

7. The charging module as recited in claim 6, wherein the port comprises a universal serial bus port.

8. The charging module as recited in claim 1, wherein the first plurality of electrical contacts each provide a similarly sized surface for engagement with the first and second conductive rails and the first plurality of electrical contacts has no more than a calculated minimal number of electrical contacts that is needed to allow the use position of the charging module to encompass any rotational orientation of the housing relative to the conductive bus over the full 360 degrees.

9. A charging module, comprising:
a housing having a base on which is disposed a centered electrical contact, a first plurality of electrical contacts, and a second plurality of electrical contacts, wherein the first plurality of electrical contacts are arranged on the base along a perimeter of a first virtual circle that is generally centered on the centered electrical contact, wherein the second plurality of electrical contacts are arranged on the base along a perimeter of a second virtual circle that is generally centered on the centered electrical contact, wherein the second virtual circle has a larger diameter than the first virtual circle, and wherein the first plurality of electrical contacts and the second plurality of electrical contacts are each sized and arranged to engage with power conducting rails of a conductive bus when the housing is placed into the use position on the conductive bus in any rotational orientation of the housing relative to the conductive bus over a full 360 degrees whereby power received from the conductive bus via an engagement between the first plurality of electrical contacts and/or the second plurality of electrical contacts and the conductive bus will be capable of being provided to a device coupled to the charging module.

10. The charging module as recited in claim 9, wherein the first plurality of electrical contacts comprises at least five electrical contacts and wherein the second plurality of electrical contacts comprises at least nine electrical contacts.

11. The charging module as recited in claim 9, wherein the centered electrical contact comprises a magnetic.

12. The charging module as recited in claim 11, wherein the housing will automatically place itself into the use position on the conductive bus when the centered electrical contact is freely positioned within a magnetically attractive distance of a communications rail of the conductive bus.

13. The charging module as recited in claim 9, wherein the housing has a port for use in electrically coupling the device to the charging module.

14. The charging module as recited in claim 13, wherein the port comprises a universal serial bus port.

15. The charging module as recited in claim 12, wherein the housing has a port for use in electrically and communicatively coupling the device to the charging module.

16. The charging module as recited in claim 15, wherein the port comprises a universal serial bus port.

* * * * *